May 20, 1952
R. C. HERGENROTHER
2,597,321
AIRCRAFT APPROACH SYSTEM
Filed April 5, 1949
3 Sheets-Sheet 1
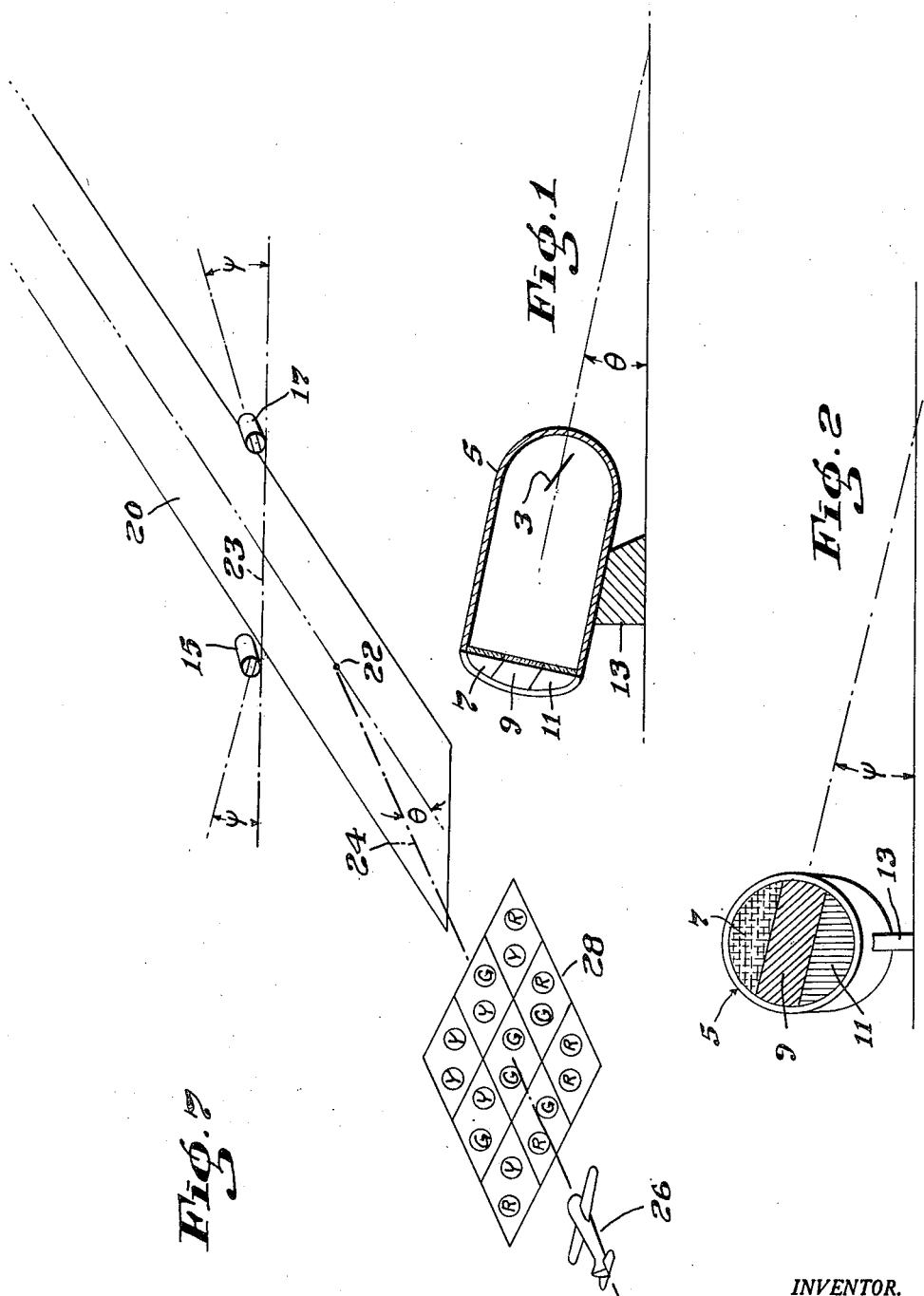
INVENTOR.
Rudolf C. Hergenrother

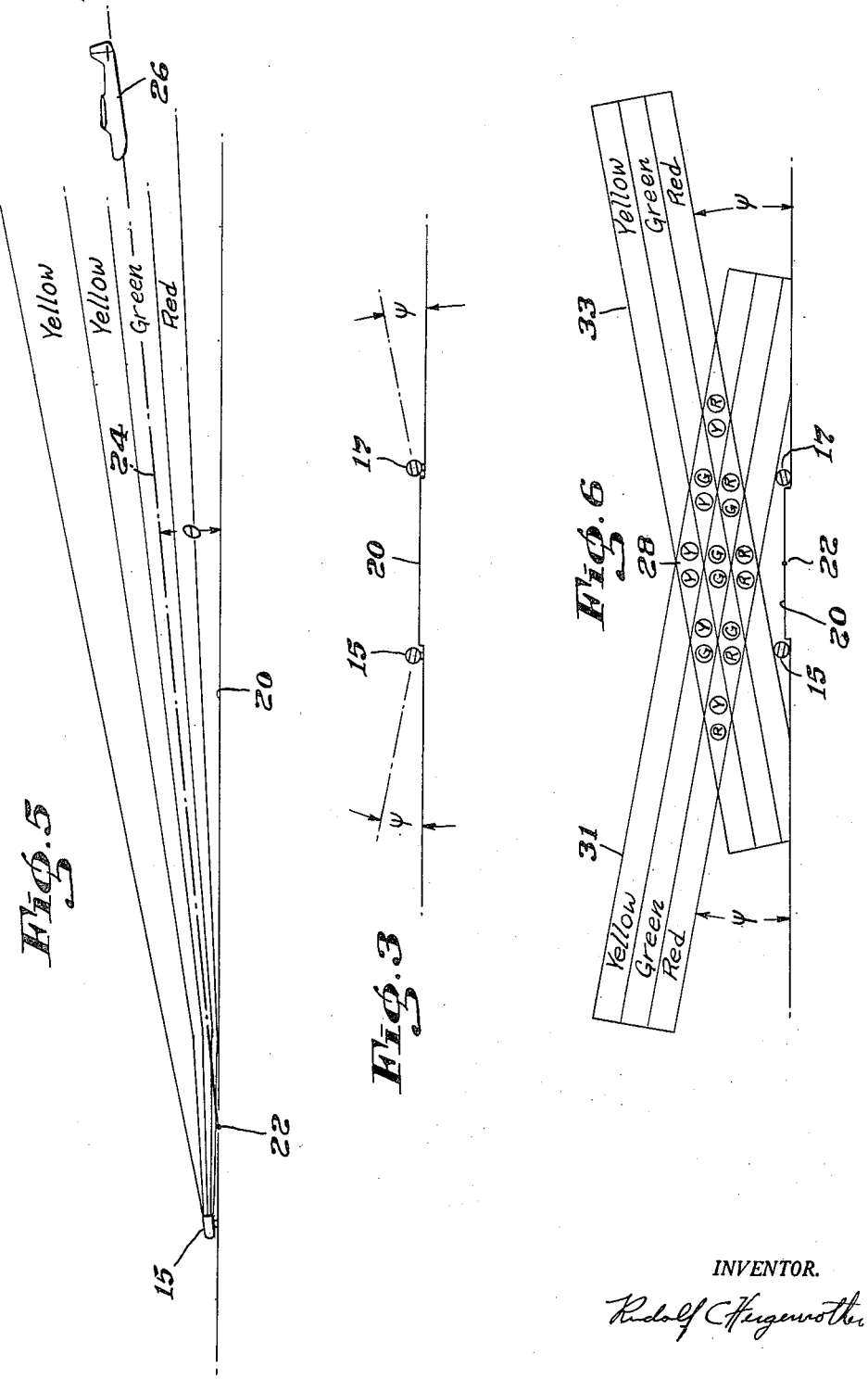

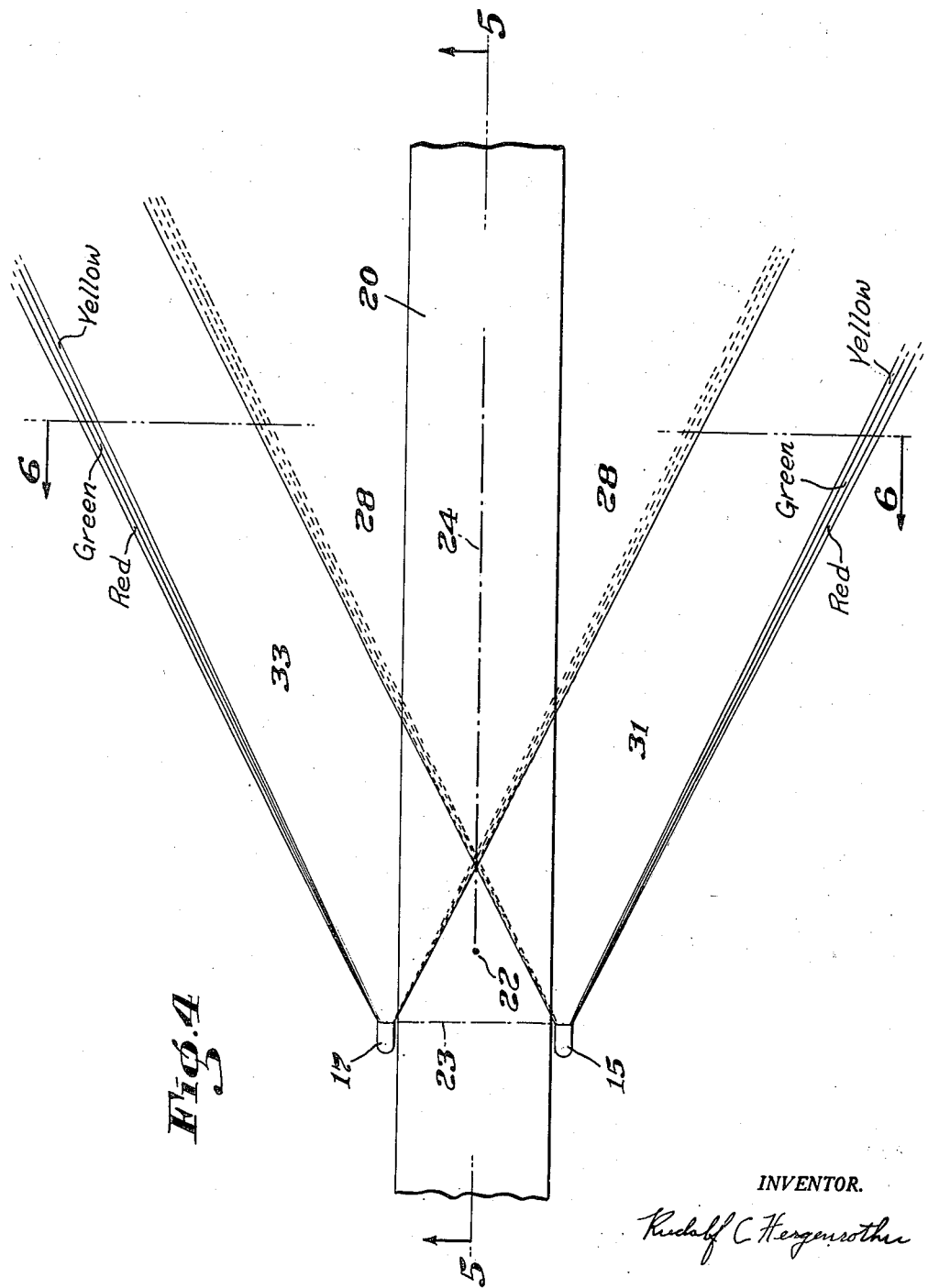

Patented May 20, 1952

2,597,321

UNITED STATES PATENT OFFICE 2,597,321

AIRCRAFT APPROACH SYSTEM

Rudolf C. Hergenrother, West Newton, Mass.

Application April 5, 1949, Serial No. 85,560

5 Claims. (Cl. 177—352)

This invention relates to a visual approach system useful in guiding aircraft along a definite flight path; for example visually to define a desired glide path for landing aircraft at night or other conditions where high landing accuracy is required, as in landing on small airfields or any closely confined areas.

An airplane is landed by flying a so-called glide path which is a generally straight line making an angle of the order of 5–10 degrees with the horizontal pointing down the center line of the runway and intersecting the ground at the point approximately where the wheels will make ground contact. The object of this invention is to provide a linear approach light system which, by means of visible colored beams of light, will indicate to the pilot whether he is approaching the runway on the desired glide path, or whether he is above, below, or to one side of the glide path. The system can be used with equal effectiveness in daylight or at night, using but two lights of low power under conditions of normal visibility. For use under conditions of low visibility, high intensity fog penetration lights can be used in the system.

A particular advantage of the approach system of my invention is the establishing of a linear glide path by the use of only two colored beacons disposed on opposite sides of the runway which the glide path intersects, resulting in considerable economy of installation costs over present visual approach systems, and further permitting the use of the system where space is limited, e. g. on an aircraft carrier deck. The system could even be made in portable form, and as such would be particularly useful for military purposes. Another advantage of my invention is that the desired landing point, fixed by the point of intersection of the glide path established by the beacons and the runway, may be a considerable distance ahead of the beacons themselves. Thus the pilot of an airplane will be guided by beacons throughout his final approach and until the time his wheels make actual contact with the runway.

Other objects and advantages will appear from the following detailed description of the attached drawings illustrating the preferred system of the invention, in which:

Fig. 1 is a sectional side perspective view of an approach light suitable for use in the system of this invention;

Fig. 2 is a front elevation of the approach light of Fig. 1;

Fig. 3 is a view illustrating the positioning of the approach lights with the runway therebetween;

Fig. 4 is a plan view of the approach system;

Fig. 5 is a longitudinal sectional view taken on line 5—5 of Fig. 4;

Fig. 6 is a diagrammatic cross-sectional view taken on line 6—6 of Fig. 4;

Fig. 7 is a perspective view further illustrating the complete system.

Referring to Figs. 1 and 2—each beacon as used in the invention includes a light source preferably extending along a line 3, an enclosure 5 and three colored filters 7, 9 and 11 at the end of the enclosure opposite the light source, whereby a fan of light of considerable angular width made up of three relatively thin superimposed layers of different colors results. Lenses and reflectors may be used to improve the optical efficiency of the beacons as may be desired. Preferably a yellow filter is employed as the upper color filter 7, a green filter as the center color filter 9 and a red filter as the lower filter 11 so that each resulting fan of light has a yellow top layer, a green center layer, and a red lower layer, though other colors may obviously be used. For some purposes, it might even be desirable to use fans of light of but a single color, possibly using a flashing code system to distinguish the separate layers if more than one layer is used.

Referring to Figs. 1, 3 and 5—the beacons 15 and 17 are supported by suitable stands 13 on opposite sides of the runway 20. Both beacons are pointed upwards at an angle $\theta$ which represents the angle of intersection of the glide path 24 with the runway 20, and are tilted toward each other at an angle $\psi$ so that the fan of light 31 from beacon 15 intersects the fan of light 33 from beacon 17, as shown diagrammatically in Fig. 6, and the center green layers establish a narrow pyramid which represents the desired glide path 24.

Referring to Fig. 7—to the pilot of an airplane 26 on final approach within the area of intersection 28 of the fans of light on the desired glide path 24, both beacons will appear green. When the aircraft deviates from the glide path, one or both beacons will appear some color other than green, as indicated diagrammatically by the circles within the area of intersection 28, in which the left-hand circle of any pair represents the color of beacon 15 and the right-hand circle represents the color of beacon 17 as seen by the pilot. If one of the beacons appears red, turnaway from the red beacon will bring the airplane to the central vertical longitudinal plane in any given vertical point of which both beacons exhibit the same color. If both beacons are yellow, the altitude of the airplane is too high; if both beacons are red, the altitude of the airplane is too low and the airplane must be pulled up to avoid landing short of the desired point of runway contact; if both beacons are green, the aircraft is on the proper approach path and will land at the desired point on the runway.

The relation between the angular width of the fan of light required to intersect the runway, the tilt of the beacon, and the glide path angle is expressed by the formula:

$$\cot \phi = \frac{\sin \psi}{\tan \theta}$$

where:

$\theta$ is the angle of the glide path and the angle at which the beacons must be pointed upward, $\phi$ is the angle measured along the plane of a fan of light between a line through the beacon parallel to the glide path, and a plane through the beacon parallel to runway surface, and $\varphi$ is the angle of tilt of the beacon toward the center of the runway.

If desired, a control system (either direct or remote) may be employed to tilt or raise the beacons correspondingly to vary the glide path in accordance with the type of aircraft using the system, or to allow for different wind velocities.

The intersection 22 of the glide path 24 with the runway 20, as established by the adjustment of the beacons 15 and 17, is forward of the beacons 15 and 17 by a distance determined by the distance between the beacons, the glide angle, and the tilt of the beacons, thus enabling the pilot to observe both lights simultaneously and well ahead of him in the last and most critical stages of his final approach. This distance is expressed by the formula:

$$L = \frac{w}{2} \frac{\tan \psi}{\tan \theta}$$

where:

L is the distance along the runway between the intersection 22 of the glide path and the runway and a line 23 between the beacons, w is the distance between the beacons, $\psi$ is the angle of tilt of the beacons toward the runway, and $\theta$ is the angle of glide path with the runway.

By adjustment of the angular width of the colored fans of light, the fan 31 from beacon 15 can be made to contact the fan 33 from beacon 17 at any desired altitude or can be made to extend to the point of landing. By adjusting the intersection point, the intersection of the green fans can be made to occur at some designated altitude somewhat above the runway so that the pilot can use this point at which the beams are no longer seen as an accurate reference point, for example as a point to begin a flare out for a landing. Further, if desired, vertical sections of different colors could be incorporated in the green layer of the fans of light in order to indicate a number of such reference points, for example to indicate several altitudes, the final one indicating the flare out point.

The approach system as described may be further modified to provide a succession of flight paths, by employing a series of pairs of beacons as described above arranged in sequence in such a way that the lines of intersection of the fans of light from one pair of beacons join with the lines of intersection of the fans of light from the preceding and following beacons. Thus a flight path of any desired configuration can be produced by joining short flight path sections as produced by a pair of beacons into the desired continuous path.

I claim:

1. A visual approach system for guiding aircraft along a linear approach path to a runway including a pair of beacons disposed at opposite sides of a runway, each of said beacons being arranged and controlled to project a substantially fan-shaped beam of light forward toward the approach end of said runway, the plane of said beam being tilted upwardly from said runway to establish an approach angle of said approach path with said runway and tilted inwardly toward the runway and said other fan-shaped beam of light to intersect the plane of said other beam along a line establishing an approach path downwardly inclined towards and alined with the runway between said beacons.

2. A visual approach system as claimed in claim 1, in which each of said fan-shaped beams of light includes a plurality of relatively thin superposed layers of different colors.

3. A visual approach system as claimed in claim 2, in which each of said fan-shaped beams of light includes a yellow top layer, a green center layer, and a red lower layer.

4. A visual approach system for guiding aircraft along a linear approach path to a runway including a pair of beacons disposed at opposite sides of a runway, each of said beacons being arranged and controlled to project a substantially fan-shaped beam of light forward toward the approach end of said runway, the plane of said beam being tilted upwardly from said runway to establish an approach angle of said approach path with said runway and tilted inwardly toward the runway and said other fan-shaped beam of light to intersect the plane of said other beam along a line establishing an approach path downwardly inclined towards and alined with the runway between said beacons, said approach path intersecting said runway at a point forward of said beacons toward the approach end of said runway.

5. A visual approach system as claimed in claim 4 in which the distance between the point at which said approach path intersects said runway and a line between said beacons is expressed by the formula $$\frac{W \tan \psi}{2 \tan \theta}$$

where:

W is the distance between the beacons $\psi$ is the angle of tilt of the beams of light, and $\theta$ is the angle of the approach path with the runway.

RUDOLF C. HERGENROTHER.

REFERENCES CITED

The following references are of record in the file of this patent:

UNITED STATES PATENTS

| Number | Name | Date |
|---|---|---|
| 1,834,041 | Bartow | Dec. 1, 1931 |
| 2,431,240 | Gausch | Nov. 18, 1947 |
| 2,441,877 | Flett | May 18, 1948 |
| 2,475,256 | Saint | July 5, 1949 |
| 2,498,294 | Pennow et al. | Feb. 21, 1950 |

FOREIGN PATENTS

| Number | Country | Date |
|---|---|---|
| 402,632 | Great Britain | Dec. 7, 1933 |
| 537,165 | Great Britain | June 11, 1941 |

OTHER REFERENCES

Civil Aeronautics Authority Journal, p. 135, Dec. 15, 1948.